United States Patent [19]

Kahn

[11] 4,194,154

[45] Mar. 18, 1980

[54] NARROW BANDWIDTH NETWORK COMPENSATION METHOD AND APPARATUS

[76] Inventor: Leonard R. Kahn, 70 N. Grove St., Freeport, N.Y. 11520

[21] Appl. No.: 900,095

[22] Filed: Apr. 26, 1978

Related U.S. Application Data

[63] Continuation-in-part of Ser. No. 662,832, Mar. 1, 1976, abandoned.

[51] Int. Cl.$^2$ ............................................. H04B 1/04
[52] U.S. Cl. .................................... 455/114; 455/119; 455/103
[58] Field of Search ...................... 325/46.50, 65, 136, 325/123, 124, 137, 156, 157, 144, 160, 181, 182, 63, 178, 179; 328/162, 163, 165; 332/37 R, 45

[56] References Cited

U.S. PATENT DOCUMENTS

| | | | |
|---|---|---|---|
| 2,285,085 | 6/1942 | Hagen | 325/50 |
| 2,666,133 | 1/1954 | Kahn | 325/137 |
| 2,989,707 | 6/1961 | Kahn | 325/137 |
| 3,085,203 | 4/1963 | Logan, Jr. et al. | 325/137 |
| 3,323,064 | 5/1967 | Remley | 325/137 |
| 3,372,350 | 3/1968 | Kawahashi et al. | 325/65 |
| 3,528,037 | 9/1970 | Yamazaki | 325/65 |

OTHER PUBLICATIONS

"Operation of AM Broadcast Transmitters into Sharply Tuned Antenna Systems," by Doherty, IRE Proc. 7/1949, pp. 729-734.

*Primary Examiner*—Robert L. Griffin
*Assistant Examiner*—Jin F. Ng

[57] ABSTRACT

A method and means for compensating for the limited bandwidth of antennas and antenna coupling networks and other high powered modulated wave equipment characterized by generating a modulated wave at a relatively low power level, passing the modulated wave through circuitry which imparts the required envelope and phase modulation to the modulated wave to compensate for said limited bandwidth characteristics and then amplifying the resulting wave in amplifiers which substantially maintain the said imparted envelope and phase modulation and which feed the limited bandwidth equipment.

15 Claims, 2 Drawing Figures

NARROW BANDWIDTH NETWORK COMPENSATION METHOD AND APPARATUS

REFERENCE TO CO-PENDING APPLICATION

This application is a continuation in part of patent application, Ser. No. 662,832 filed Mar. 1, 1976 now abandoned.

BACKGROUND OF THE INVENTION

This invention relates to transmitters and transmitting antennas and to means for reducing distortion and poor frequency response characteristics caused by limited bandwidth antennas and antenna coupling networks and also to other high powered modulated wave equipment.

Because of the limited bandwidth of some antennas, the real and imaginary components of the impedance that the transmitter sees are not constant and not symmetrical as a function of frequency. Thus, the impedance versus frequency characteristics of such electrical systems has both symmetrical and non-symmetrical impedance vs. frequency variable characteristics. This causes impedance mismatching at certain frequencies covered by the various components of the modulated wave. In many situations the higher modulation frequency components are greatly attenuated because of variations in impedance and transfer characteristics of the antenna and the antenna matching network.

Furthermore, in most cases the antenna impedance is not a symmetrical function relative to the carrier frequency. That is, the impedance above the carrier frequency is not a mirror image of the impedance below the carrier frequency. Nor does the impedance characteristic have a constant phase slope which is a condition required for constant time delay. Because of this non-symmetry, harmonic distortion as well as frequency distortion problems are introduced. An extreme example of this would be if one sideband was shifted by 180 degrees from its original phase and the other sideband was not shifted, the amplitude modulated wave would be converted to a quadrature modulated wave with complete loss of the fundamental component and where only second harmonic components and other even harmonics would be present. This, of course, would be a situation where the system would be completely distorted and unuseable for conventional AM broadcasting.

While practical antennas do not introduce such severe problems they do degrade frequency response and introduce noticeable harmonic distortion. The present invention greatly reduces the problem so as to create a flatter frequency response and decreases envelope harmonic distortion.

Papers have been published in engineering journals describing and analyzing the problems caused by limited bandwidth antennas and the use of special networks in the antenna coupling means for improving the bandwidth of the antennas and reducing asymmetrical impedance characteristics.

For example, Mr. W. H. Doherty in the July 1949 Proceedings of the I.R.E., pages 729-734, published a paper entitled "Operation of AM Broadcast Transmitters into Sharply Tuned Antenna Systems" describing the deleterious effects of limited bandwidth antennas and describing the distortion produced by nonsymmetrical amplitude and phase-frequency characteristics of antennas. Mr. Doherty also described means for equalizing antenna system frequency characteristics using special matching networks. Other authors have published details on similar approaches to solving this problem (see Radio Engineering Handbook, K. Henney, Editor, McGraw-Hill, New York, 1959, 5th Edition, pages 20-37, 20-38 and the bibliography at 20-125 to 20-134, especially 20-128 to 20-129 covering M-f antennas). Unfortunately, these methods are expensive to utilize and the equipment is quite large and in some instances occupies more space than the associated transmitter.

U.S. Pat. No. 3,528,037, issued to Mr. K. Yamazaki, disclosed a method for compensating for nonlinear distortion and phase distortion by converting an amplitude modulated wave to a frequency modulated wave, compensating the wave, and finally converting the FM wave back to an amplitude modulated wave. This patent does not disclose means for altering the symmetry of the spectrum of the modulated wave so as to compensate for the nonsymmetrical treatment of sidebands around the carrrier by the antenna system and does not describe means for reducing envelope distortion caused by linear devices, such as an antenna, without introducing additional sidebands and increasing the bandwidth of the signal.

Conventional feedback techniques which utilize envelope detection are capable of removing envelope distortion but do not provide a satisfactory solution to the problem of limited bandwidth antennas. The reason for this is that the distortion produced due to the narrow band nature of the antenna is not produced by amplitude nonlinearities and the introduction of new sideband components, but in actuality is caused by the shift in phase or magnitude of the desired sideband and carrier components. The envelope detector feedback arrangement will introduce additional sideband components in an attempt to remove the envelope distortion with the result that the spectrum will be widened increasing interference.

SUMMARY OF THE INVENTION

Characteristic advantages and features of the narrow band network compensation system includes the use of compensation networks at a lower power level than in the prior art so that small, inexpensive components may be used. Also, since the power level is low, the compensation or equalization networks can be inefficient because the loss of energy can readily be recouped by use of low power amplifiers. In some embodiments of this invention the equalization is accomplished at IF further reducing the cost of the equalization circuit.

This invention is particularly suitable for compensating for the limited bandwidth of antennas and antenna coupling circuits and other electrical systems used for transmitting AM, FM, and TV waves.

The arrangements disclosed herein for cancelling distortion by predistorting a modulated wave do not introduce additional sideband components but merely alter the relationship of the existing sidebands. Addition of sidebands would widen the signal and increase interference to other signals.

The main application of this invention is to improve the performance of amplitude modulated wave systems commonly designated as A3 wave systems which transmit a carrier and upper and lower sidebands. A conventional amplitude modulated wave is structured so that the vector sum of the two sidebands is in-phase with the carrier component. (The term "in-phase" used here and in the claims is synonymous with the term in-line and denotes freedom from a quadrature component. Thus, the vector sum of the sidebands for pure amplitude modulated waves are always at a 0 degrees or at a 180 degrees relative to the carrier.)

Unfortunately, many types of antennas upset this desired in-phase relationship, especially for sidebands caused by high audio frequency components, and thereby cause envelope distortion. The balance may be upset by amplitude and/or phase versus frequency shifts of passive devices such as transducers and antenna systems including their coupling networks which do not effect the sidebands and carrier in a symmetrical fashion. Accordingly, even though an antenna system may be completely free of amplitude non-linearities it may cause severe distortion of an amplitude modulated wave by distributing the in-phase relationship between the carrier and the vector sum of the sidebands.

While it is expected that most applications of this invention will be for the improvement of AM transmission systems, the basic system may be used in improving performance of other transmission systems requiring specific relationships between the various components of modulated waves.

For amplitude modulated systems, the invention accomplishes the task of reducing envelope distortion by using means for generating an amplitude modulated wave at a power level substantially below that of the power level of the wave radiated by the antenna system. The output of the low powered generator is then fed to a network which shifts the relationship of the sidebands to the carrier in amplitude and phase so as to predistort low powered modulated wave in such a manner as to compensate for the frequency sensitive distortion producing characteristics of the antenna system. Thus, the network causes the vector sum of the upper and lower sidebands to be displaced from the normal in-phase relationship with the carrier by an angle equal in magnitude but opposite in direction of displacement to that caused by the associated antenna system.

The output of the network is then amplified to a power level suitable for feeding the antenna system. The power amplifier must be constructed so as to faithfully amplify the modulated wave including the predistortion characteristics and should not introduce additional sidebands. The output of the amplifier is then coupled to the antenna system and the predistortion will substantially cancel the distortion heretofore created by the amplitude-frequency and phase-frequency characteristics of the antenna system.

Since most transmitters use high efficiency nonlinear power amplifiers, one preferred embodiment of this invention uses the envelope elimination and restoration system, as desribed below.

In accordance with the present invention, a method for reducing envelope harmonic distortion of a double-sideband amplitude modulated wave produced when the wave is passed through a narrowband antenna coupler and antenna system. A double-sideband amplitude modulated wave is generated at low power level relative to the power level fed to the antenna. This wave is then passed through an equalizer network which operates directly on the amplitude modulated wave and which is adjusted to predistort the low powered amplitude modulated wave in such a manner so that when the modulated wave subsequently passes through the antenna coupler and antenna system the predistortion effectively counteracts the harmonic distortion caused by the limited bandwidth characteristic of the antenna and the antenna coupler system. This predistorted wave is then power amplified in circuitry that maintains the predistortion characteristic imparted to the modulated wave by the equalizer and the power amplified wave is then fed to the antenna coupler and antenna system.

The method above described can be used wherein the frequency of the low power double-sideband amplitude modulated wave has a carrier frequency materially below that of the operating frequency of the antenna system and wherein equipment is provided for converting the frequency of the generated wave to the operating frequency of the antenna system.

If the envelope elimination and restoration system is used as a power amplifier system, the output of the equalizer network is fed to means for isolating the phase modulation component and resulting phase modulated component is fed to power amplifying means.

The output of the equalizer network is also fed to means for isolating the envelope component of the altered waves and the resulting wave is used to envelope modulation the amplified phase modulating component so as to reconstruct the altered modulated wave at a high power level. This reconstructed wave is fed to means for connecting the reconstructed wave to the antenna system.

This network compensation system can be used for the following services:

AM/monophonic transmission, AM stereo transmission, FM transmission, TV transmission, sonar systems and industrial systems.

The system can be used so that the modulated wave is equalized at an intermediate frequency (IF) and means are provided to change the IF wave to the output frequency of the transmission equipment. Also, the low powered modulated wave may be generated and equalized at the same frequency as the frequency of the wave fed to the antenna.

Other features and advantages of the invention will be apparent from the following description and discussion of certain typical embodiments of the invention.

DESCRIPTION OF THE PREFERRED EMBODIMENT

Figure 1:
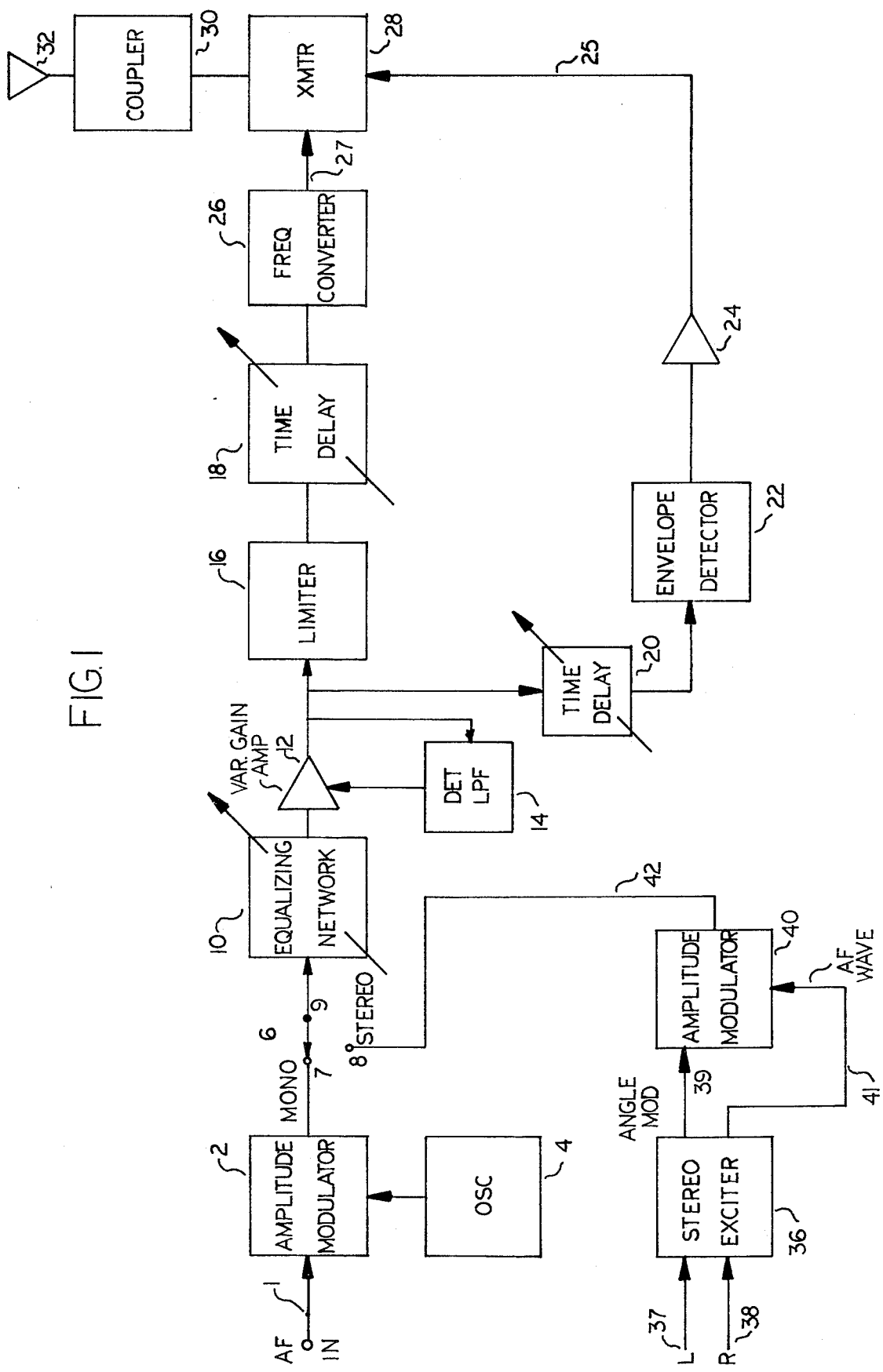
FIG. 1 is a simplified Block Diagram of one embodiment of the overall equalization system suitable for use with transmitter using nonlinear RF amplifiers and where the equalization network operates at an IF and where the system utilizes techniques described in U.S. Pat. No. 2,666,133 and other EER improvement patents and papers cited in the "Summary of the Invention" section of this specification.

FIG. 1 illustrates in block diagram form one typical system embodying the present invention.

The system shown in FIG. 1 is capable of AM monophonic transmission as well as AM Stereo. For monophonic operation, the audio signal is fed to the amplitude modulator 2, through line 1. Also feeding the amplitude modulation is oscillator 4, which operates at a conventient IF; for example, 100 kHz. The output of modulator 2, is connected to switch 6, which connects modulator 2 to the equalizer network 10.

In the case of AM Stereo operation the switch 6, connects equalizer 10, to the AM stereo amplitude modulator 40. In stereo operation the left and right audio signals are fed to lines 37 and 38 respectively which in turn feed stereo exciter 36. Stereo exciter 36 may be designed in accordance with a number of inventions; for example, it may be designed according to the teachings of my U.S. Pat. Nos. 3,218,393 and 3,908,090. The angular modulation at; for example, an IF of 100 kHz feeds the amplitude modulator 40, through line 39. In the case where the stereo exciter follows the teachings of U.S. Pat. Nos. 3,218,393 and 3,908,090 the angular modulation is Phase Modulation whereas other stereo systems may use Frequency Modulation. The audio wave fed to the amplitude modulator 40, via line 41, is in almost all AM stereo systems produced from the summation of the L and R stereo components. The output of amplitude modulator 40 feeds switch 6.

It will be appreciated by those skilled in the art that oscillator 4, may be part of Stereo Exciter 36, and that one amplitude modulator can be used instead of the two separate modulators 2 and 40. Furthermore, it is to be expected that in many uses of this invention the equipment may only be required to operate only monophonically or only stereophonically and the equipment may accordingly be simplified.

Equalizer 10 should be designed so that the modulated wave fed to it is predistorted by said equalizer in such a manner so that when the modulated wave subsequentially passes through the coupler, 30, and antenna 32, the predistortion effectively counteracts the deleterious effects of the limited bandwidth and nonsymmetry of the antenna and antenna coupler. Of course, the designer of equalizer 10, must provide suitable circuit elements for correction of the specific antenna to be corrected.

When adjusting equalizer 10, note that the voltages and currents in the high powered equipment should be carefully monitored to guard against overload. Also, initial adjustments should be performed at reduced power levels and/or reduced modulation levels.

Figure 2:
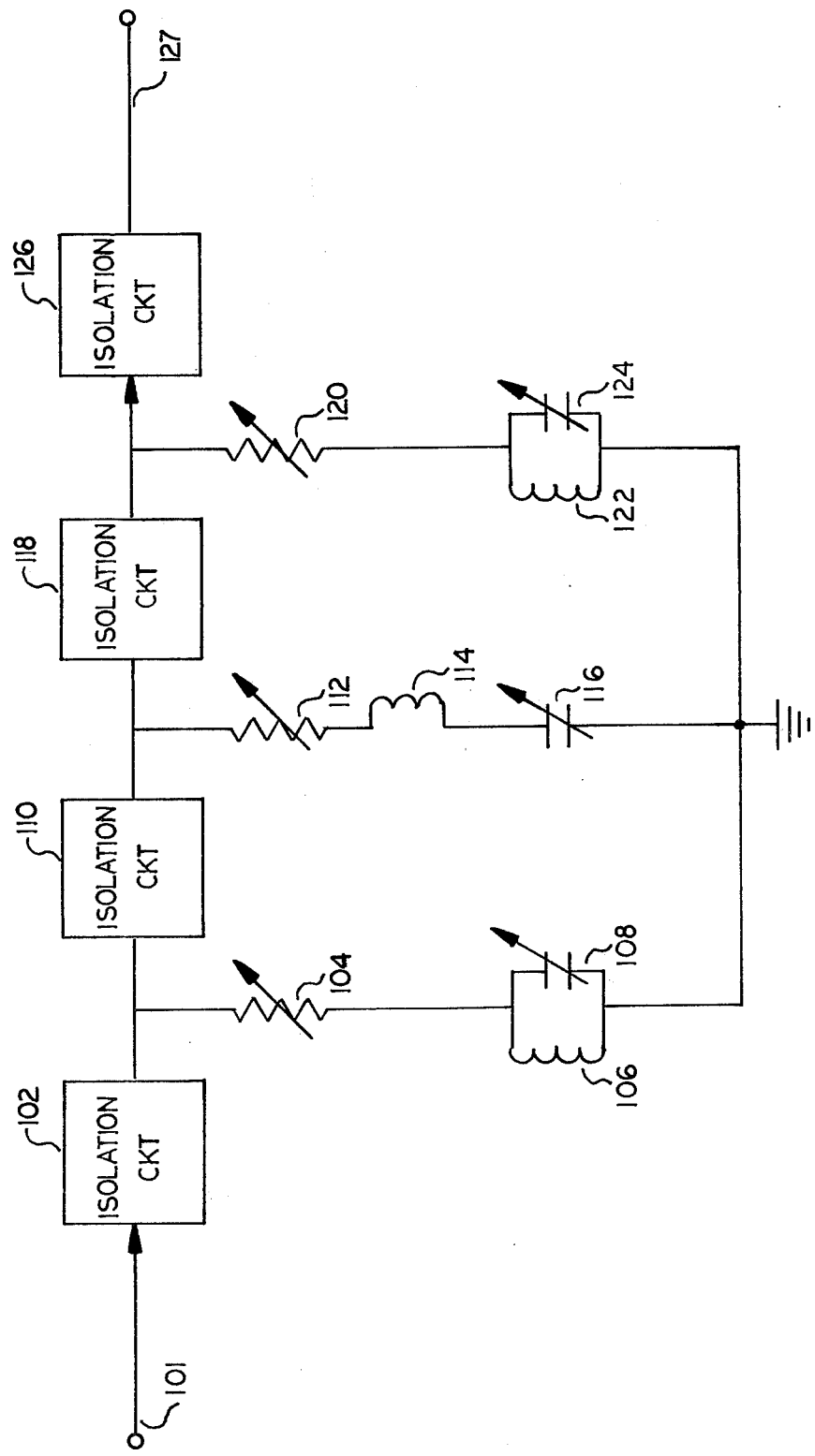
FIG. 2 shows a simplified Schematic/Block Diagram of one type of equalizer which may be used to perform the functions of block 10 in FIG. 1.

In some situations the user of this invention will find it desirable to use components having higher voltage and current ratings of critical circuitry so that when full compensation is provided none of the parts will be subjected to overload even under testing conditions using full amplitude tones. FIG. 2 shows a simplified schematic of one possible version of equalizer 10 and will be described below.

The output of equalization network 10, feeds variable gain amplifier 12 in FIG. 1. Amplifier 12 and detector/lowpass filter 14, operate as an automatic volume control system. This circuit is provided so that when equalizer 10 is adjusted any variations in the average output level caused by the adjustment is automatically compensated for by the action of the AVC circuit. This arrangement reduces the difficulty of adjusting the system although the AVC circuit is not essential to the practice of the invention.

The output of variable gain amplifier 12, in one embodiment of the invention, feeds an EER system type transmission system which faithfully amplifies the phase modulation component and envelope modulation components of the predistorted modulation wave. Details of the design and operation of such systems have been disclosed in the following patents and papers; U.S. Pat. Nos. 2,666,133, 2,774,041, 2,903,518 and 3,012,209 and papers; L. R. Kahn, "Comparison of Linear Single-Sideband Transmitters with Envelope Elimination and Restoration Single-Sideband Transmitters", Proc. of I.R.E., Dec. 1956, pp. 1706–1712. L. R. Kahn, "Single-Sideband Transmission by Envelope Elimination and Restoration", Proc. of I.R.E., July 1952, pp. 803–806.

Essentially the envelope elimination and restoration system separates the phase modulation and envelope modulation components of a hybrid modulated wave and amplifies them separately, so that the PM component can be amplified in high efficiency nonlinear amplifiers. After the two components have been separately amplified to suitable power levels the envelope modulation component modulates the PM component producing a high powered wave having the same phase modulation and envelope modulation component as the input modulated wave.

Returning to FIG. 1 the output of variable gain amplifier 12 feeds two circuits one of which is limiter 16. Limiter 16 eliminates the envelope modulation component from the wave and the result is a phase modulated (PM) wave. This PM wave feeds variable time delay network 18. The purpose of the time delay network is to delay the PM component so that it reaches the modulated stage in the transmitter 28 at the same time as the envelope modulation component. The time delay is normally required in the PM component path because the PM path is generally wider, thus faster, than the envelope modulation path. The time delay network can also be connected ahead of the limiter if it is more convenient.

The output of time delay network 18, feeds frequency converter 26, which converts the frequency of the intermediate frequency PM component wave to the output frequency of the transmitter or if desired, and in accordance with the teachings of the prior art covering envelope elimination and restoration (EER) systems, to a subharmonic of the output frequency. The output of the frequency converter 26, feeds transmitter 28, which may use high efficiency nonlinear power amplifiers and which incorporates an amplitude modulator.

The envelope modulator component is also derived from the output of variable gain amplifier 12 which may feed variable time delay network 20. Time delay network 20 would be required for those relatively rare transmitters where the time delay of PM component path is greater than the envelope modulation path. It is possible to switch time delay network 18 to the envelope modulation path as will be noted by those skilled in the art and it would also be feasible to use an audio frequency delay circuit after envelope detection.

The IF wave from time delay network 20, if used, or directly from the amplifier 12 if the time delay network 20 is not provided, feeds envelope detector 22, which derives the desired envelope modulation component which after amplification in audio amplifier 24, feeds the audio modulation input of transmitter 28 via line 25.

As described in detail in the above cited literature describing EER systems the result of this processing is that the output of transmitter 28, is a higher powered and higher frequency replica of wave found at the output of amplifier 12, including the desired distortion reduction components required for compensation of the narrowband coupler 30 and antenna 30 to which transmitter 28 is connected.

Thus, this overall procedure materially reduces harmonic distortion and reduces frequency response distortion caused by the limited bandwidth of the antenna and its coupler.

FIG. 2 is a showing, partly in schematic and partly in block form, of the equalizer circuit portion of the system shown in FIG. 1 where this circuit is identified as block 10. The input to the equalizer is line 101 which feeds block 102. Block 102, as well as 110, 118 and 126 are isolation circuits which may be simply resistors or may be amplifier stages. They are used to isolate sections of the equalizer circuit so that the sections do not interact and makes the adjustment of sections difficult to perform.

Resistor 104, inductance 106, and capacitor 108 form a section for boosting the relative level of components that have a frequency which approximates the resonant frequency of inductance 106 and capacitor 108. For example, if a lower sideband component produced by an 8 kHz audio wave is attenuated in the antenna circuit capacitor 108 should be adjusted so that the circuit is tuned to 100 kHz −8 kHz or 92 kHz. The amount of the relative boost may be set by adjusting 104.

The output of the section formed by elements 104, 106 and 108 feeds isolation circuit 110 which in turn feeds a dip circuit utilizing resistor 112, inductance 114 and capacitor 116. This circuit can be used to reduce the amplitude of frequency components which are favored by the antenna. Capacitor 116 is adjusted to tune this section to the correct frequency and resistor 112 adjusted for the proper relative attenuation.

The section utilizing resistor 120, inductance 122, and capacitor 124, functions in the same manner as the section utilizing components 104, 106 and 108 and can be set to another frequency band, either above or below the carrier frequency or at the carrier frequency requiring boost. The output of this section feeds isolation circuit 126 which may feed additional stages if required or feed variable gain amplifier 12 of FIG. 1.

The nonsymmetrical characteristic of the antenna can be compensated with audio frequency equalizers if an independent sideband generator is available. While the use of audio equalizers has certain advantages, this embodiment requires the use of an independent sideband generator with upper and lower sideband filters having good response characteristics even at frequencies close to the carrier frequency. Because such filters are generally expensive, for most applications of the invention, it is preferable to perform the equalization after modulation either at an intermediate frequency or at the final operating frequency.

This invention has been described in some detail emphasizing the AM broadcasting application. However, persons skilled in the art will recognize that this invention can be used for a wide range of applications where high powered modulated or keyed waves are required. For example, it can be used in Sonar applications to overcome the bandwidth restrictions of transducers. It can also be used in broadcast applications other than AM; for example, FM and television, and it can be used in communications transmitters. Furthermore, there are a number of industrial and atomic energy applications using high powered modulated or pulse waves where this invention can greatly improve the performance of such equipment, and correct for poor load characteristics and limited bandwidth transducers.

It should be evident to those skilled in the art that the above described embodiments of the invention cover various methods for removing distortion and frequency response distortion caused by the narrowband characteristics of devices processing modulated waves. The basic procedure used is to introduce compensating phase modulation and envelope modulation terms so as to effectively cancel the distortion produced by the narrow band devices.

It is important to note that when this invention is used to reduce distortion of modulated wave systems, the reduction is accomplished by use of linear compensating networks which do not introduce additional sideband components.

In all cases, it is understood that the above-described arrangements are merely illustrative of the many possible specific embodiments which represent applications of the present invention. Numerous and other varied arrangements can be readily devised in accordance with the principles of the present invention without departing from the spirit and scope of the invention.

What is claimed is:

1. A method for reducing distortion of modulated waves caused by passive devices operating at power levels substantially greater than the power level at which the modulated wave was generated, such as transducers and antenna systems used for transmitting modulated waves which alter the desired amplitude and phase relationships between the upper and lower sidebands of the modulated wave creating said distortion comprising;
    (a) generating a modulated wave at a power level substantially below the power level fed to the passive device,
    (b) altering the phase and amplitude relationships between the upper and lower sidebands of the wave generated in Step (a) in such a manner as to compensate for the distortion caused by the passive device,
    (c) amplifying the altered modulated wave of Step (b) to a level required to drive the passive device in an amplifier which faithfully maintains the altered relationships between the upper and lower sidebands of the modulated wave, and
    (d) feeding the amplified wave to the passive device.

2. A method for reducing envelope distortion of a double-sideband amplitude modulated wave produced when the wave is passed through a narrowband antenna system, comprising;
    (a) generating a double-sideband amplitude modulated wave at low power level relative to the power level fed to the antenna system,
    (b) passing the low powered amplitude modulated wave generated in Step (a) through an equalizer network which operates directly on the amplitude modulated wave to predistort the low powered amplitude modulated wave by changing phase and amplitude of sideband components of the modulated wave without introducing additional sideband components and in such a manner so that when the predistorted wave subsequentially passes through an antenna coupler and antenna system the predistortion effectively counteracts the envelope distortion caused by limited bandwidth characteristic of the antenna system
    (c) power amplifying the output of the equalizer network in circuitry that substantially maintains the predistortion introduced by the equalizer network to the modulated wave, and,
    (d) feeding the thus amplified wave to the antenna coupler and antenna system.

3. The method according to claim 2 wherein the low powered modulated wave is generated at the same frequency range as the wave fed to the antenna system.

4. The method of claim 2 wherein the generated wave of Step (a) has a carrier frequency materially different than that of the operating frequency of said antenna system and wherein a step is incorporated for converting the frequency of the generated wave to the operating frequency of the antenna system.

5. A system for reducing the harmonic distortion produced by a variable impedance versus frequency characteristic of an antenna system when radiating modulated waves comprising;
   (a) means for generating a modulated wave operating at a power level substantially less the power level at which the antenna system operates,
   (b) network means connected through linear coupling means for changing the phase and amplitude relationships between the upper and lower sidebands of the modulated wave so as to predistort the modulated wave generated in (a) means in such a manner that when the modulated wave subsequently passes through the antenna system the predistortion effectively counteracts harmonic distortion caused by said variable impedance characteristic of the antenna system,
   (c) means for power amplifying the output signal of the network means to the higher powered level, said amplifying means capable of faithfully amplifying the predistorted modulated wave, and,
   (d) means for connecting the output of power amplifying means to the antenna system.

6. The system according to claim 5 wherein said network means is adjustable.

7. A system to claim 5 wherein the power amplifier means is an envelope elimination and restoration type of amplifying system.

8. A system for equalizing the amplitude-frequency and phase-frequency characteristics of an antenna and antenna coupling circuit, comprising;
   (a) means for producing a modulated wave at a power level appreciably lower than the power level of said antenna,
   (b) means for altering the amplitude-frequency and phase-frequency characteristics of the generated modulated wave so as to compensate for the amplitude-frequency and phase-frequency characteristics of said antenna and antenna coupling circuit,
   (c) means for isolating the phase modulation component of the modulated wave produced in (b),
   (d) means for power amplifying the phase modulation component,
   (e) means for isolating the envelope component of the wave produced in (b),
   (f) means for envelope modulating the amplified phase modulation component with the isolated envelope component to reconstruct the wave produced in (b) at a high power level, and,
   (g) means for connecting the reconstructed wave to the antenna coupling circuit.

9. A system according to claim 8 wherein the modulated wave is a monophonic AM wave.

10. A system according to claim 8 wherein the modulated wave is an AM stereo wave.

11. A system according to claim 8 wherein the modulated wave is an FM wave.

12. A system according to claim 8 wherein the modulated wave is a TV wave.

13. A system according to claim 8 wherein the modulated wave is produced at an intermediate frequency and means are provided for changing the IF to the output frequency of the transmission equipment.

14. A system for reducing envelope distortion of a double-sideband amplitude modulated wave, said distortion caused by frequency sensitive characteristics of an antenna system which cause the vector sum of the two sidebands to shift from its desired in-phase relationship with the carrier; comprising;
   (a) means for generating a modulated wave at a power level substantially less than the power fed to the antenna system,
   (b) network means for shifting the relationship of the sidebands to the carrier so as to predistort the modulated wave in such a manner as to compensate for the frequency sensitive distortion producing characteristics of the antenna system,
   (c) means for power amplifying the predistorted modulated wave to a substantially higher powered wave, said power amplifying means constructed so as to substantially faithfully amplify the modulated wave including the predistortion characteristics produced by the (b) means, and,
   (d) means for coupling the output of the power amplifying means to the antenna system.

15. The method of reducing distortion in amplitude modulated waves caused by antenna systems which shift relationship of components of the modulated wave in such a manner as to cause envelope distortion, comprising;
   (a) generating an amplitude modulated wave including a carrier and upper and lower sidebands at a power level substantially below that of the power to be fed to the antenna system,
   (b) causing the vector sum of said upper and lower sidebands to be displaced from an in-phase relationship with the carrier by angle amounts substantially equal in magnitude but opposite in direction to displacement caused by the antenna system,
   (c) amplifying the modulated wave as processed by Step (b) to a power level suitable level to feed the antenna system in an amplifier which faithfully maintains the sideband-carrier relationships of Step (b), and,
   (d) feeding the amplified modulated wave to the antenna system.

* * * * *